United States Patent [19]

Devries

[11] 4,238,461
[45] Dec. 9, 1980

[54] REMOVAL OF ODORS FROM GAS STREAMS

[75] Inventor: Egbert Devries, Kettering, Ohio

[73] Assignee: Quad Corporation, Highland Park, Ill.

[21] Appl. No.: 80,792

[22] Filed: Sep. 28, 1979

[51] Int. Cl.³ .............................................. B01D 53/34
[52] U.S. Cl. .................... 423/210; 423/224; 423/245; 239/75; 261/115; 261/DIG. 34; 422/111
[58] Field of Search ...................... 423/210, 224, 245; 239/61, 75; 261/115, 129, DIG. 34; 422/110, 111

[56] References Cited

U.S. PATENT DOCUMENTS 4,125,589  11/1978  de Vries ............................ 423/245

FOREIGN PATENT DOCUMENTS 1333635  10/1973  United Kingdom ..................... 423/210

Primary Examiner—Earl C. Thomas
Attorney, Agent, or Firm—Fidelman, Wolffe & Waldron

[57] ABSTRACT

Odoriferous constituents are removed from relatively dry and/or warm gas streams by contacting the gas with a very finely divided aqueous spray containing a reagent reactive toward the odoriferous constituents of the gas. Droplet size of the aqueous spray is controlled as a function of temperature and relative humidity of the gas stream so as to prevent complete evaporation of liquid droplets and to achieve a maximum droplet size after evaporation of about ten microns.

8 Claims, 2 Drawing Figures

REMOVAL OF ODORS FROM GAS STREAMS

BACKGROUND OF THE INVENTION

This invention relates generally to a process for removing odoriferous constituents from waste gas streams.

More specifically, this invention relates to the removal of odors from relatively dry and/or warm process gas streams by contacting those streams with an aqueous solution of a reactive chemical in the form of very finely divided droplets.

DISCUSSION OF THE PRIOR ART

It has been conventional in the prior art to remove odors from gas streams by scrubbing or washing the gases with aqueous chemical solutions. A number of different types of apparatus have been proposed and used for this purpose. These include the simple spray towers, packed towers of various kinds, and venturi contactors of a variety of types. These traditional prior art approaches have in common a relatively short contact time between the gas and liquid spray and use a relatively large volume of liquid per volume of gas treated. Liquid use typically ranges from about five to about one hundred gallons per thousand cubic feet of gas treated. Because of the large volumes of scrubbing liquid used, the bulk of the liquid is recirculated repeatedly through the scrubber.

A limiting factor in the recirculation of scrubbing liquid is the gradual buildup of reaction products and impurities in the liquid. The recirculating liquid also invariably builds up a certain amount of solids content which may be dirt, grit, or solid reaction products. Presence of these solid particulates tends to clog nozzle orifices and to cause abrasive wear of the nozzles. It is therefore conventional to use large orifice nozzles because of their nonclogging characteristics and relatively low liquid pressures in order to reduce abrasive wear. This results in poor atomization of the liquid with a production of large droplets, often on the order of 400 microns or larger. Typical of such prior art processes are those described in British Pat. No. 1,152,705 and U.S. Pat. No. 3,933,450.

My U.S. Pat. No. 4,125,589 describes a different approach for the removal of odoriferous constituents from essentially saturated gas streams such as those derived from rendering operations. The process therein described utilizes relatively small volumes of liquid in very finely droplet form with relatively long gas-liquid contact times. This approach results in substantially better odor removal using a much smaller volume of treating liquid than do prior art processes.

In the use of my previously described process in the treatment of relatively dry and warm to hot process streams it was found that odor removal efficiency of the process occasionally became erratic. This erratic performance was determined to be caused by essentially complete evaporation of many of the introduced liquid droplets with a concomitant degradation or deactivation of the treating reagent.

SUMMARY OF THE INVENTION

I have found that odoriferous constituents may be efficiently removed from a relatively dry and/or warm waste gas stream by contacting the gas with finely divided droplets of an aqueous chemical reagent reactive toward the odoriferous constituents. The droplet size and volume of the spray introduced into the gas is adjusted as a function of the temperature and relative humidity of the gas stream so as to produce upon equilibrium residual liquid droplets having a maximum diameter of about ten microns. The volume of liquid reagent introduced into the gas is adjusted to produce a droplet volume after equilibration with the gas ranging from about 0.01 to 1.0 gallons of reagent per thousand cubic feet of gas.

Hence, it is an object of my invention to remove odors and noxious constituents from waste gas streams. Another object of my invention is to remove contaminants from relatively dry and/or warm waste gas streams.

GENERAL DISCUSSION OF THE INVENTION

This invention finds use in the removal of odorous, noxious, or otherwise undesirable contaminants from relatively dry process gas streams displaying from ambient to moderately elevated temperature such as those produced in the treatment or conversion of animal, vegetable or other organic materials. One example of a process producing such a relatively dry and odorous gas stream is coffee roasting. The invention will be better understood by reference to the drawings which schematically depict the invention.

Figure 1:
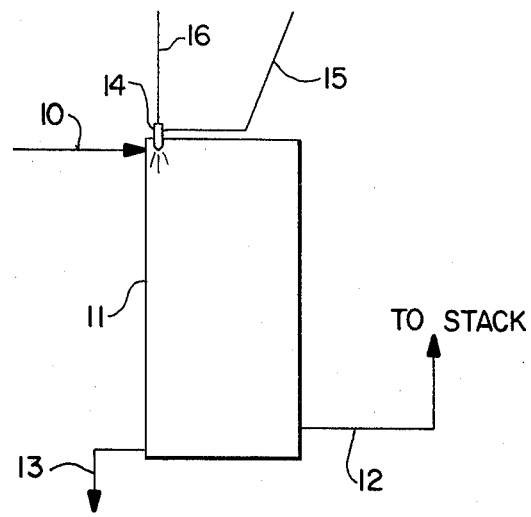
FIG. 1 is a schematic flow sheet of the process.

Referring now to FIG. 1, a process gas stream 10 containing odorous or otherwise undesirable constituents is passed into the upper portion of a gas treatment means 11. In its simplest form, means 11 may comprise a cylindrical vessel having gas entry means 10 disposed near the top thereof, gas exit means 12 at a lower level and liquid drainage means 13 at the bottom or floor thereof. Liquid drainage means 13 provides an exit for settled out spray liquid which contains the reaction products of the chemical reagent and the odoriferous constituents of the gas stream. This reaction residue is passed to waste or otherwise disposed of. Under no circumstances is it appropriate to recycle this residue stream because of its low volume and high concentration of reaction products. Disposed at or near the gas entry means 10 is nozzle means 14 with liquid supply conduit 15 and pressurized gas supply conduit 16 leading into the nozzle body. While only one nozzle is shown in the drawing, it is to be understood that a plurality of such nozzles would ordinarily be used.

The interior of vessel 11 is entirely open without packing or contacting surfaces of any kind so as to allow unimpeded settling of liquid droplets produced by nozzle 14 in the gas contained within the vessel. Vessel 11 is sized according to the volume of gas being treated so as to provide a retention time of the gas within the vessel of at least about three seconds and preferably about twenty seconds or more. Means 11 preferably comprises the apparatus disclosed and claimed in copending commonly assigned patent application Ser. No. 103,321, filed Dec. 14, 1979 which is a continuation of Ser. No. 955,341 filed Oct. 27, 1978, and now abandoned. The disclosure in that application is incorporated by reference herein.

Figure 2:
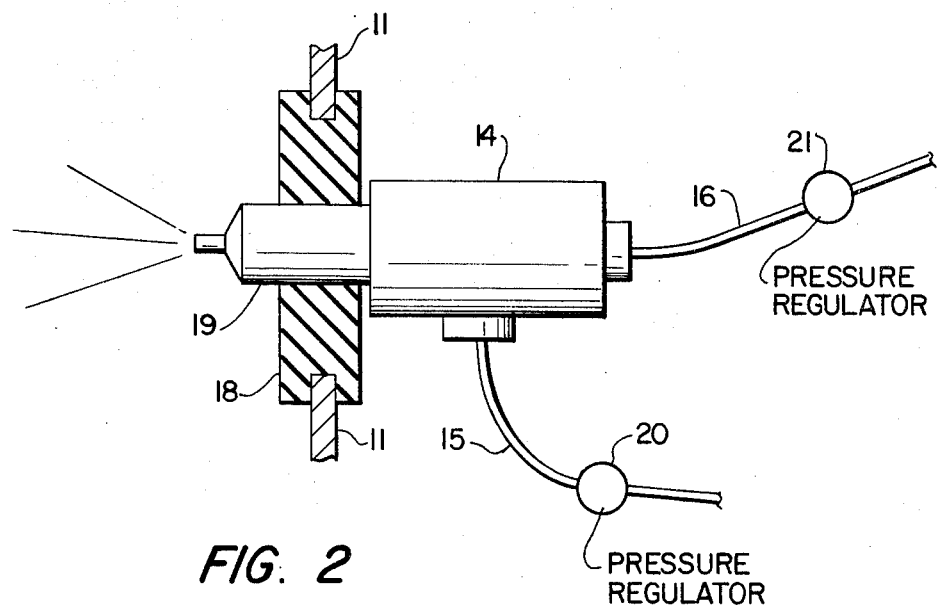
FIG. 2 illustrates a nozzle and droplet size control means for the nozzle.

Referring now to FIG. 2, there is shown in more detail an exemplary nozzle and its mounting in the upper wall or roof of vessel 11 at or in close proximity to the entering gas stream. Any nozzle capable of producing a closely sized droplet spray adjustable over the general droplet size range of about 10 to about 50 microns is suitable for use in the process. Nozzle 14 may be of the type referred to as a supersonic nozzle and is supplied with a pressurized gas which suitably may be air, but which also may be nitrogen or other gases, by way of conduit 16. A liquid reagent, typically an aqueous solution of oxidizing agent, is supplied to the nozzle by way of conduit 15. The nozzle is constructed to cause the gas to expand, accelerate and issue from the nozzle in the form of a low pressure stream having supersonic velocity. Liquid introduced into the nozzle is atomized into very tiny droplets by the action of high energy sonic pressure waves.

Nozzle 14 may be mounted in the wall or roof of vessel 11 at or near the gas entry means 10 as is shown in the figure. A relatively large hole may be drilled through the vessel wall to accomodate grommet 18 which may be of rubber or other resilient material. The grommet is sized to provide a gripping fit with a circular forepart 19 of the nozzle.

One example of a suitable nozzle for use in this process is that disclosed in U.S. Pat. No. 3,741,484. The operating characteristics of such nozzles are well defined with the maximum droplet size produced by the nozzle being governed by the pressure of liquid 15 and gas 16 supplied to the nozzle. Pressure regulating valves 20 and 21 are disposed in liquid conduit 15 and gas conduit 16 respectively. Droplet size produced by the nozzle is controlled by varying the pressure of the liquid and gas supplied to the nozzle.

Successful operation of my process requires that the following operating parameters be met. First, the droplet size produced by nozzle 14 must be controlled as a function of the temperature and relative humidity of the entering gas stream so that after equilibration of the droplet spray there remains within the treating vessel liquid droplets having a maximum diameter on the order of ten microns. Second, the spray volume produced by the nozzles must be adjusted to provide after equilibration with the gas stream a volume ranging from about 0.01 to 1.0 gallons per thousand cubic feet of gas.

The small droplet size after equilibration with the incoming gas stream is important to the successful functioning of my invention for a number of reasons. First, the small droplet size results in the number of drops present in the reaction zone increasing by many orders of magnitude as compared to ordinary spray washing techniques. The vastly greater number of drops present in the reaction zone increases the chance of contact or collision between a droplet and an odorous molecule or particle enormously. In addition, contact time within the reaction zone is a function of the settling rate of a droplet. The free falling velocity of a ten micron water droplet in gas at atmospheric pressure is well under one foot per second. Because the terminal velocity, or free falling velocity, of a liquid droplet in air increases as the square of the particle diameter, it can readily be appreciated that gas-liquid contact time within the treatment zone is highly dependent upon the droplet diameter. The small droplet diameter also functions to create a huge surface area for chemical reaction. As the reactions taking place in the process can be characterized generally as chemical mass transfer, the very large gas-liquid interface resulting from the very small liquid droplet diameter allows a chemical reaction to proceed at a faster rate and go more nearly to completion than is possible in conventional gas-liquid contacting devices.

The liquid droplet size required for a particular gas stream is dependent upon the temperature and relative humidity of the gas and may be readily calculated. For example, in the treatment of a particular gas stream having a temperature of 200° F. and essentially zero relative humidity, it was determined that a spray volume of ten micron droplets totaling about 0.025 to 0.03 gallons per thousand cubic feet was required to react with and neutralize the odors contained in the gas. By routine calculation, the volume of water required to saturate that gas stream was determined. The droplet size required to allow evaporation from individual droplets to produce upon equilibrium with the gas stream droplets having a maximum diameter of about ten microns was then calculated and found to be 22 microns. It is to be noted that increasing droplet diameter from 10 to 22 microns increased the volume of individual droplets more than 10 fold.

In most applications of the described process, the chemical reagent will comprise an oxidizing agent. A preferred oxidizing agent is sodium hypochlorite at a concentration within the aqueous spray ranging from about 10 ppm to 5%. A more preferred range is from 100 to 500 ppm. Such solutions will react with and neutralize the odors of commonly occuring compounds such as organic sulfides, amines, aldehydes, ketones and alcohols. Other odorous constituents commonly present in waste gas streams which are unreactive toward oxidizing reagents are amenable to treatment with acids or bases such as sulfuric acid or sodium hyroxide.

While the invention has been described in relation to a particular process, other uses and modifications thereof will be evident to those skilled in the art.

I claim:

1. A method for removing odoriferous constituents from a relatively dry waste gas stream which comprises:
    passing the waste gas into an upper level of a treatment zone;
    introducing into the gas stream at a point at or near its entry into the treatment zone a finely divided spray comprising an aqueous solution of a chemical reagent reactive toward said odoriferous constituents;
    adjusting the droplet size and volume of said spray according to the temperature and relative humidity of said gas stream to produce upon equilibrium of the gas and spray residual liquid droplets having a maximum diameter of about 10 microns and having a residual liquid volume ranging from about 0.01 to about 1.0 gallons per thousand cubic feet of gas;
    allowing the droplets to fall unimpeded through the treatment zone for at least about 3 seconds;
    removing a treated gas stream from a lower level of the treatment zone, and
    separately removing settled out spray liquid, now containing the reaction products of said chemical reagent and odoriferous gas constituents, from the bottom of the treatment zone.

2. The method of claim 1 wherein the reactive chemical reagent is selected from the group consisting of oxidizing agents, acids and bases.

3. The method of claim 2 wherein the chemical reagent is an oxidizing agent.

4. The method of claim 3 wherein the oxidizing agent is sodium hypochlorite.

5. The method of claim 1 wherein the residual liquid volume ranges from about 0.01 to 0.1 gallon per thousand cubic feet of gas.

6. The method of claim 5 wherein the reactive chemical reagent is sodium hypochlorite.

7. The method of claim 6 wherein the concentration of said sodium hypochlorite in the liquid spray ranges from about 100 to 500 ppm.

8. The method of claim 5 wherein the fall time of droplets in the treating zone is in excess of 10 seconds.

* * * * *

REEXAMINATION CERTIFICATE (682nd)

United States Patent [19]

[11] B1 4,238,461

[45] Certificate Issued * May 19, 1987

Devries

[54] REMOVAL OF ODORS FROM GAS STREAMS

[75] Inventor: Egbert Devries, Kettering, Ohio

[73] Assignee: Quad Corporation, Highland Park, Ill.

Reexamination Request:
No. 90/001,003, May 5, 1986

Reexamination Certificate for:
Patent No.: 4,238,461
Issued: Dec. 9, 1980
Appl. No.: 80,792
Filed: Sep. 28, 1979

Terminal Disclaimer:
Filed: Aug. 27, 1986 (1072 O.G. II)

[ * ] Notice: The portion of the term of this patent subsequent to Nov. 14, 1995 has been disclaimed.

[51] Int. Cl.[4] .............................................. B01D 53/34
[52] U.S. Cl. ...................................... 423/210; 239/75; 261/115; 261/DIG. 34; 422/111; 423/224; 423/245
[58] Field of Search ....................... 423/210, 224, 245; 422/110, 111; 239/61, 75; 261/115, 129, DIG. 34

[56] References Cited

U.S. PATENT DOCUMENTS

| | | | |
|---|---|---|---|
| 2,271,642 | 2/1942 | Holzwarth | 55/90 |
| 3,593,496 | 7/1971 | Merrill | 55/77 |
| 3,885,918 | 9/1972 | Isahaya | 23/284 |
| 4,125,589 | 11/1978 | de Vries | 423/245 |
| 4,141,702 | 2/1979 | de Vries | 423/224 |
| 4,225,566 | 9/1980 | de Vries | 423/245 |

FOREIGN PATENT DOCUMENTS

| | | | |
|---|---|---|---|
| 71381 | 6/1977 | Japan | 423/245 |

OTHER PUBLICATIONS

The Condensed Chemical Dictionary, Seventh Edition Van Nostrand Reinhold Co., (1966) pp. 552–553.
Chemical Engineers' Handbook, 5th ed., Perry & Chilton, Eds. McGraw-Hill Book Co., 1973, pp. 18–23.

*Primary Examiner*—Andrew Metz

[57] ABSTRACT

Odoriferous constituents are removed from relatively dry and/or warm gas streams by contacting the gas with a very finely divided aqueous spray containing a reagent reactive toward the odoriferous constituents of the gas. Droplet size of the aqueous spray is controlled as a function of temperature and relative humidity of the gas stream so as to prevent complete evaporation of liquid droplets and to achieve a maximum droplet size after evaporation of about ten microns.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1 and 3 are determined to be patentable as amended.

Claims 4-8, dependent on an amended claim, are determined to be patentable.

New claims 9-12 are added and determined to be patentable.

1. A method for removing odoriferous constituents from a relatively dry waste gas stream which comprises:
    passing the waste gas into an upper level of a treatment zone;
    introducing into the gas stream at a point at or near its entry into the treatment zone a finely divided spray comprising an aqueous solution of a chemical reagent reactive toward said odoriferous constituents, *said reagent solution selected from the group consisting of oxidizing agents, acids and bases*;
    adjusting the droplet size and volume of said spray according to the temperature and relative humidity of said gas stream *to saturate the gas stream with water vapor and* to produce upon equilibrium of the gas and spray residual liquid droplets having a maximum diameter of about 10 microns and having a residual liquid volume ranging from about 0.01 to about 1.0 gallons per thousand cubic feet of gas;
    allowing the droplets to fall unimpeded through the treatment zone for at least about 3 seconds;
    removing a treated gas stream from a lower level of the treatment zone, and
    separately removing settled out spray liquid, now containing the reaction products of said chemical reagent and odoriferous gas constituents, from the bottom of the treatment zone.

3. The method of claim [2] *1* wherein the chemical reagent is an oxidizing agent.

9. *The method of claim 1 wherein the chemical reagent is an acid.*

10. *The method of claim 9 wherein the acid is sulfuric acid.*

11. *The method of claim 1 wherein the chemical reagent is a base.*

12. *The method of claim 11 wherein the base is sodium hydroxide.*

* * * * *